United States Patent [19]
Zink

[11] 4,403,095
[45] Sep. 6, 1983

[54] METHINE COMPOUNDS

[75] Inventor: Rudolf Zink, Therwil, Switzerland

[73] Assignee: Ciba-Geigy Corporation, Ardsley, N.Y.

[21] Appl. No.: 242,793

[22] Filed: Mar. 11, 1981

[30] Foreign Application Priority Data

Mar. 21, 1980 [CH] Switzerland .................. 2241/80

[51] Int. Cl.³ .......................................... C07D 413/06
[52] U.S. Cl. ........................................ 542/466; 8/565
[58] Field of Search ........................................ 542/466

[56] References Cited

U.S. PATENT DOCUMENTS

| | | | |
|---|---|---|---|
| 2,077,063 | 4/1937 | Wolff | 542/466 |
| 3,855,209 | 12/1974 | Hoyle | 542/466 |
| 3,890,307 | 6/1975 | Straley et al. | 542/466 |
| 4,246,404 | 1/1981 | Gertisser | 542/466 |
| 4,288,589 | 9/1981 | Loew et al. | 542/466 |

FOREIGN PATENT DOCUMENTS 2917996 11/1979 Fed. Rep. of Germany .

Primary Examiner—Arthur P. Demers
Attorney, Agent, or Firm—Edward McC. Roberts

[57] ABSTRACT

There are described novel brilliant red methine compounds of the formula I

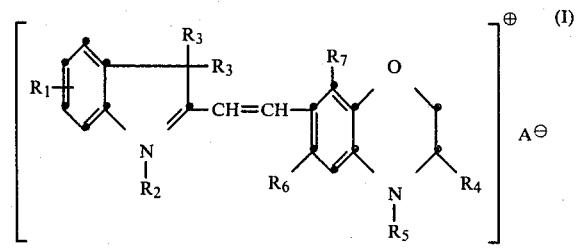

wherein $R_1$ is hydrogen, $NO_2$, halogen, unsubstituted or substituted $C_1$-$C_4$-alkyl, or it is $C_1$-$C_4$-alkoxy, $R_2$ is unsubstituted or substituted $C_1$-$C_4$-alkyl, $R_3$ independently of one another are each $C_1$-$C_4$-alkyl, $R_4$ is hydrogen, unsubstituted or substituted $C_1$-$C_4$-alkyl or unsubstituted or substituted aryl, $R_5$ is unsubstituted or substituted $C_1$-$C_4$-alkyl, or it is $C_3$-$C_4$-alkenyl, $R_6$ and $R_7$ independently of one another are each hydrogen, $C_1$-$C_4$-alkyl, $C_1$-$C_4$-alkoxy or halogen, and A is an anion, processes for producing them, and their use as dyes for dyeing and printing materials which can be dyed with cationic dyes, particularly polyacrylonitrile materials, the dyeings obtained being distinguished by a brilliant shade and good fastness to light.

17 Claims, No Drawings

METHINE COMPOUNDS

The invention relates to novel methine compounds, to processes for producing them, and to their use as dyes for dyeing and printing materials which can be dyed with cationic dyes, particularly textile materials.

Novel methine compounds have been found which correspond to the general formula I

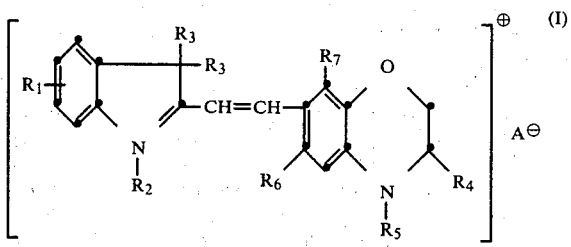

wherein
$R_1$ is hydrogen, $NO_2$, halogen, unsubstituted or substituted $C_1$–$C_4$-alkyl, or it is $C_1$–$C_4$-alkoxy,
$R_2$ is unsubstituted or substituted $C_1$–$C_4$-alkyl,
$R_3$ independently of one another are each $C_1$–$C_4$-alkyl,
$R_4$ is hydrogen, unsubstituted or substituted $C_1$–$C_4$-alkyl or unsubstituted or substituted aryl,
$R_5$ is unsubstituted or substituted $C_1$–$C_4$-alkyl, or it is $C_3$–$C_4$-alkenyl,
$R_6$ and $R_7$ independently of one another are each hydrogen, $C_1$–$C_4$-alkyl, $C_1$–$C_4$-alkoxy or halogen, and
A is an anion.

In preferred methine compounds of the formula I, the substituent $R_1$ is in the p-position with respect to the nitrogen bond.

$R_1$ as halogen is for example the chlorine, bromine or fluorine atom. When $R_1$ is an unsubstituted $C_1$–$C_4$-alkyl group, it can be a straight-chain or branched-chain alkyl group, for example the methyl, ethyl, n- and iso-propyl group and the n-, sec- or tert-butyl group. If $R_1$ is a substituted $C_1$–$C_4$-alkyl group, substituents are in particular: halogen, such as fluorine, chlorine or bromine, and $C_1$–$C_4$-alkoxy, such as the methoxy, ethoxy or propoxy group. When $R_1$ is a $C_1$–$C_4$-alkoxy group, it is especially an unsubstituted, straight-chain or branched-chain alkoxy group, such as the methoxy, ethoxy, n- or iso-propoxy group.

In preferred methine compounds of the formula I, $R_1$ is halogen, preferably chlorine, and particularly hydrogen.

As an unsubstituted or substituted $C_1$–$C_4$-alkyl group, $R_2$ is a straight-chain or branched-chain alkyl group, for example the methyl, ethyl, n- and iso-propyl group and the n- and iso-butyl group, which alkyl groups can be substituted, for example by: halogen, such as fluorine, chlorine or bromine, by CN, by a carboxylic acid amide group, which can be mono- or disubstituted on the N atom by $C_1$–$C_4$-alkyl groups, or they can be substituted by an OH group, by a phenyl group or by a $C_1$–$C_4$-alkoxy group.

In preferred methine compounds of the formula I, $R_2$ is an unsubstituted, straight-chain $C_1$–$C_4$-alkyl group, in particular the methyl group.

As a $C_1$–$C_4$-alkyl group, $R_3$ is an unsubstituted alkyl group analogous to those of the substituent $R_1$.

In preferred methine compounds of the formula I, the $R_3$'s are each the same $C_1$–$C_4$-alkyl group, particularly the methyl group.

$R_4$ as a $C_1$–$C_4$-alkyl group is an unsubstituted or substituted, straight-chain or branched-chain alkyl group (the methyl, ethyl, n- and iso-propyl group and the n- and iso-butyl group); and a substituent is especially the CN group. As an aryl group, $R_4$ is for example the phenyl group or the α- or β-naphthyl group, which aryl groups are unsubstituted or they can be mono- or polysubstituted for example by halogen, such as fluorine, chlorine or bromine, by CN or by $C_1$–$C_4$-alkyl or $C_1$–$C_4$-alkoxy groups.

In preferred methine compounds of the formula I, $R_4$ is in particular an unsubstituted $C_1$–$C_4$-alkyl group, preferably the methyl group or hydrogen.

When $R_5$ is an unsubstituted or substituted $C_1$–$C_4$-alkyl group, it can be a straight-chain or branched-chain alkyl group, which can be mono- or polysubstituted. Mentioned as substituents are for example: phenyl, acetoxy, CN, halogen such as fluorine, chlorine or bromine; OH and $C_1$–$C_4$-alkoxy.

If $R_5$ is a $C_3$–$C_4$-alkenyl group, the allyl group may be particularly mentioned.

In preferred methine compounds of the formula I, $R_5$ is a substituted $C_1$–$C_4$-alkyl group, particularly the $-C_2H_4CN$ group.

When $R_6$ and/or $R_7$ are a $C_1$–$C_4$-alkyl group, they are both straight-chain and branched-chain alkyl groups (methyl, ethyl, n- and iso-propyl and n- and iso-butyl). If $R_6$ and/or $R_7$ are an alkoxy group, this is for example a methoxy, ethoxy, n- and iso-propoxy group or an n- and iso-butoxy group. As halogen, $R_6$ and/or $R_7$ are the fluorine, chlorine or bromine atom.

In preferred methine compounds of the formula I, $R_6$ and $R_7$ are each hydrogen.

As an anion, "A" denotes both organic and inorganic anions, for example anions of halogen, such as chloride, bromide or iodide, also of sulfate, methosulfate, aminosulfonate, perchlorate, carbonate, bicarbonate, phosphate, phosphomolybdate, phosphotungstate, phosphotungstomolybdate, benzenesulfonate, toluenesulfonate, 4-chlorobenzenesulfonate, naphthalenesulfonate, oxalate, maleinate, formiate, acetate, propionate, lactate, succinate, chloroacetate, tartrate, methanesulfonate, benzoate and rhodanide, or complex anions, such as the anion of zinc chloride double salts or tetrafluoroborate.

Particularly valuable methine compounds on account of their good fastness to light, especially on polyacrylonitrile materials, are those of the formula

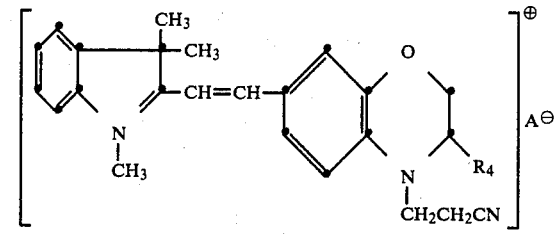

wherein $R_4$ has the meaning defined under the formula I, and in particular is hydrogen or methyl.

The novel methine compounds of the formula I according to the invention can be obtained by condensing 2-methyleneindoline of the formula II

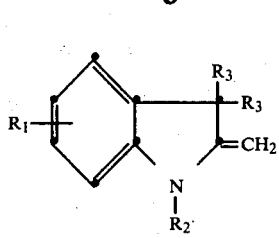

with a benzomorpholine-7-aldehyde of the formula III

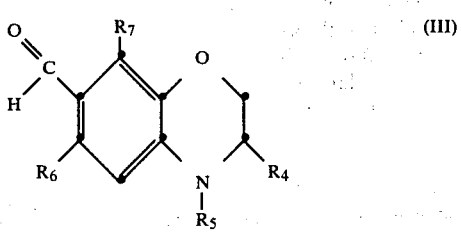

wherein the symbols $R_1$ to $R_7$ have the meanings defined under the formula I, in the presence of an acid HA, in which A is an anion.

The condensation reaction of the methylene compound of the formula II with the aldehydes of the formula III is performed in a known manner, for example in glacial acetic acid at a temperature of between about 0° and 100° C. It is possible to use instead of glacial acetic acid another organic acid, such as formic acid, or an arylsulfonic acid, such as benzenesulfonic acid, or also an inorganic acid, such as hydrochloric acid, sulfuric acid or phosphoric acid.

Another possible method of producing the methine compounds of the formula I is to condense a 2-methyleneindoline of the formula II with a benzomorpholine-7-aldehyde of the formula III in an organic solvent with agents splitting off water.

If the reaction is performed in organic solvents with agents splitting off water, aprotic organic solvents can be used, for example aliphatic, optionally chlorinated, hydrocarbons, such as cyclohexane, methylene chloride, chloroform or tetrachloroethylene, or aromatic, optionally chlorinated hydrocarbons, such as toluene, chlorobenzene or dichlorobenzene, as well as ketones and ethers; and the agents splitting off water can be for example phosphorus oxychloride and thionyl chloride.

After the condensation reactions, the novel methine compounds are separated from the reaction medium and dried. In the methine compounds of the formula I, the anion A can, if desired or necessary, be exchanged in a known manner for another anion.

The starting compounds of the formulae II and III are known, or they can be produced in a known manner. The compounds of the formula III are thus obtained for example by starting with the corresponding benzomorpholine derivatives and formylating these in the 7-position by means of the Vilsmeier reaction.

The following are examples of indolines of the formula II:

1,3,3-trimethyl-2-methylene-indoline and 1,3,3-trimethyl-5-chloro-2-methylene-indoline; and benzomorpholines of the formula III are for example: N-methyl-3-methyl-benzomorpholine-7-aldehyde, N-methyl-benzomorpholine-7-aldehyde, N-(β-cyanoethyl)-3-methyl-benzomorpholine-7-aldehyde, N-(β-hydroxyethyl)-3-ethyl-benzomorpholine-7-aldehyde, N-allyl-benzomorpholine-aldehyde, N-β-cyanoethylbenzomorpholine-7-aldehyde, 3,6-dimethyl-N-β-cyanoethylbenzomorpholine-7-aldehyde, N-ethyl-benzomorpholine-7-aldehyde, 3-methyl-N-allyl-benzomorpholine-7-aldehyde, N-benzyl-benzomorpholine-7-aldehyde, N-β-chloroethyl-benzomorpholine-7-aldehyde, and 3-methyl-6-chloro-N-ethyl-benzomorpholine-7-aldehyde.

The methine compounds of the formula I according to the invention are used in particular as dyes for dyeing and, with the addition of binders, for printing of materials dyeable with cationic dyes, especially textile materials, which consist for example advantageously of homo- or copolymers of acrylonitrile, or synthetic polyamides or polyesters which are modified by acid groups. In addition, the novel methine compounds are used for dyeing wet tow, plastics materials, leather and paper. Dyeing is preferably performed from an aqueous neutral or acid medium by the exhaust process, optionally under pressure, or by the continuous process. The textile material can be in the widest variety of forms, for example in the form of fibres, filaments, fabrics, knitted goods, piece-goods and finished articles, such as shirts and pullovers.

Finally, the novel methine compounds of the formula I can be used also in the transfer printing process.

There can be produced by application of the dyes according to the invention very brilliant red dyeings and printings, especially on polyacrylonitrile materials, which are characterised by very good general fastness properties, particularly by good fastness to light. The obtainment of brilliant shades in combination with a good fastness to light of the dyeings is surprising.

Those methine compounds of the formula I which have good solubility in organic solvents, such as perchloroethylene, are suitable also for dyeing the textile materials mentioned, or for dyeing for example plastic materials, from organic media.

In the following Examples which serve to further illustrate the invention, 'parts' denote parts by weight, percentages are percent by weight, and the temperature values are in degrees Centigrade.

EXAMPLE 1

5.75 parts of 3-methyl-N-β-cyanoethylbenzomorpholine-7-aldehyde are dissolved in 15 parts of glacial acetic acid; 4.33 parts of 1,3,3-trimethyl-2-methylene-indoline are added, and the mixture is stirred for 21 hours at 40°–42°. 80 parts of water at 20° are then added, and the mixture is clarified with active charcoal through a filtering aid. The clarified solution is added dropwise to a mixture of 30 parts of ice, 17 parts of 30% hydrochloric acid and 1.7 parts of zinc chloride at a maximum of 10°. The dye salt of the formula

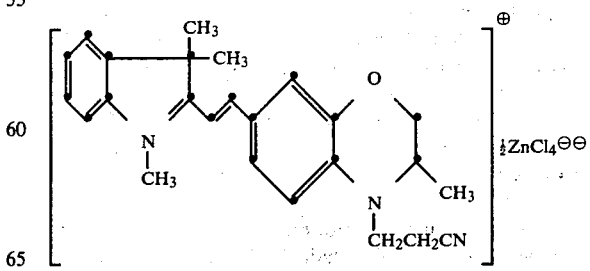

precipitates in crystalline form and is filtered off. The yield after drying in vacuo at 70° is 12 parts of a red dye which dyes polyacrylonitrile fibres in brilliant bluish-red shades having good fastness properties.

Further valuable dyes are obtained by using equivalent amounts of the indoline and benzomorpholine compounds listed in the following Table, the procedure being analogous to that described in the above Example. The methine compounds (zinc chloride salts) obtained are given in the 4th column of the Table.

TABLE

| 1 No. | 2 Indoline compound | 3 Benzomorpholine compound | 4 Methine compound | 5 Shade on polyacrylonitrile |
|---|---|---|---|---|
| 2 | (structure) | (structure) | (structure) | brilliant pink |
| 3 | " | (structure) | (structure) | brilliant red |
| 4 | " | (structure) | (structure) | brilliant red |
| 5 | (structure) | (structure) | (structure) | brilliant red |
| 6 | " | (structure) | (structure) | brilliant red |
| 7 | " | (structure) | (structure) | brilliant red |

TABLE-continued

| 1 No. | 2 Indoline compound | 3 Benzomorpholine compound | 4 Methine compound | 5 Shade on polyacrylonitrile |
|---|---|---|---|---|
| 8 | | | | brilliant red |
| 9 | | | | brilliant red |
| 10 | | | | brilliant red |
| 11 | " | | | brilliant red |

EXAMPLE 12

5 g of the cationic dye produced according to Example 1 are stirred to a paste with 2 g of 40% acetic acid, and the paste is taken into solution by the addition of 4000 g of hot water. There are then added 1 g of sodium acetate and 2 g of an addition product of 15 to 20 equivalents of ethylene oxide with N-octadecyldiethylenetriamine, which product has been quaternised with dimethyl sulfate, and 100 g of polyacrylonitrile fabric are introduced at 60°. The bath is heated within 30 minutes to 100°, and the material is dyed in the boiling liquor for 90 minutes. The liquor is then allowed to cool in the course of 30 minutes to 60°. The material dyed in this manner is removed and subsequently raised with lukewarm water and cold water. A brilliant bluish red polyacrylonitrile dyeing which is very fast to light is obtained.

EXAMPLE 13

A polyacrylonitrile copolymer consisting of 93% of acrylonitrile and 7% of vinyl acetate is dissolved in dimethylacetamide to give a 15% solution. The spinning solution is then extruded into a spinning bath consisting of 40% of dimethylacetamide and 60% of water. The resulting tow is subsequently drawn by known methods, and is freed from the dimethylacetamide by rinsing with hot and cold water.

This wet tow is dyed by immersion in an aqueous bath at 42° of the following composition:
9 g of dye according to Example 1 per liter,
pH value 4.5 with acetic acid.

The contact time tow/dye liquor is 2 seconds. The excess dye liquor is subsequently squeezed out, and the tow is fed into the dryer. A tow dyed in a brilliant bluish red shade having a very good fastness to light is obtained.

What is claimed is:
1. A methine compound of the formula

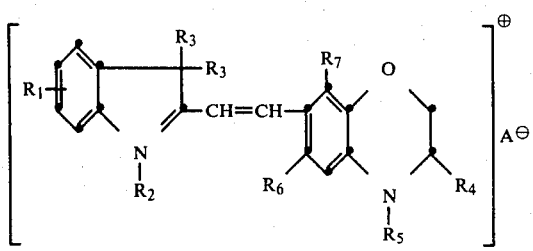

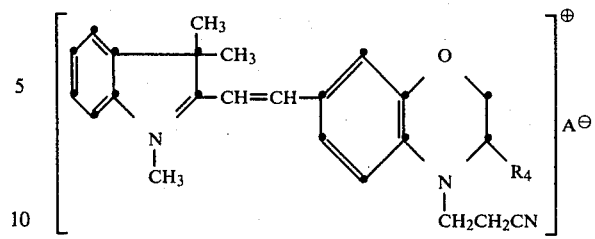

wherein $R_1$ is hydrogen, $NO_2$, halogen, $C_1$-$C_4$-alkyl, halo-$C_1$-$C_4$-alkyl, $C_1$-$C_4$-alkyloxy-$C_1$-$C_4$-alkyl or $C_1$-$C_4$-alkoxy, $R_2$ is $C_1$-$C_4$-alkyl, or $C_1$-$C_4$-alkyl substituted by halogen, cyano, carbamoyl, hydroxyl, phenyl or $C_1$-$C_4$-alkoxy, $R_3$ independently of one another are each $C_1$-$C_4$-alkyl, $R_4$ is hydrogen $C_1$-$C_4$-alkyl, cyano-$C_1$-$C_4$-alkyl, aryl, halo-aryl, cyano-aryl, $C_1$-$C_4$-alkylaryl, or $C_1$-$C_4$-alkoxyaryl, $R_5$ is $C_3$-$C_4$-alkenyl, $C_1$-$C_4$-alkyl, or $C_1$-$C_4$-alkyl substituted by phenyl, acetoxy, cyano, halogen, hydroxy, or $C_1$-$C_4$-alkoxy, $R_6$ and $R_7$ independently of one another are each hydrogen, $C_1$-$C_4$-alkyl, $C_1$-$C_4$-alkoxy or halogen, and A is an anion.

2. A methine compound according to claim 1, wherein the substituent $R_1$ is in the p-position with respect to the nitrogen bond.

3. A methine compound according to claim 1, wherein $R_1$ is hydrogen or halogen.

4. A methine compound according to claim 3, wherein $R_1$ is hydrogen.

5. A methine compound according to claim 1, wherein $R_2$ is unsubstituted $C_1$-$C_4$-alkyl.

6. A methine compound according to claim 5, wherein $R_2$ is methyl.

7. A methine compound according to claim 1, wherein the $R_3$'s are each the same $C_1$-$C_4$-alkyl group.

8. A methine compound according to claim 7, wherein each $R_3$ is the methyl group.

9. A methine compound according to claim 1, wherein $R_4$ is an unsubstituted $C_1$-$C_4$-alkyl group or hydrogen.

10. A methine compound according to claim 9, wherein $R_4$ is the methyl group.

11. A methine compound according to claim 1, wherein $R_5$ is a substituted $C_1$-$C_4$-alkyl group.

12. A methine compound according to claim 11, wherein $R_5$ is the —$C_2H_4CN$ group.

13. A methine compound according to claim 1, wherein $R_6$ and $R_7$ are each hydrogen.

14. A methine compound of claim 1, wherein $R_1$ is hydrogen or chlorine, $R_2$ and $R_3$ are each methyl, $R_4$ is hydrogen, methyl or phenyl, $R_5$ is methyl, ethyl, cyanomethyl, chloromethyl, methoxymethyl, phenylmethyl, cyanoethyl, chloroethyl, methoxyethyl, phenylethyl or allyl, $R_6$ is hydrogen, chlorine or methyl, and $R_7$ is hydrogen.

15. A methine compound according to claim 1 of the formula

16. A methine compound of claim 15, wherein $R_4$ is hydrogen or methyl.

17. A process for producing a methine compound of the formula

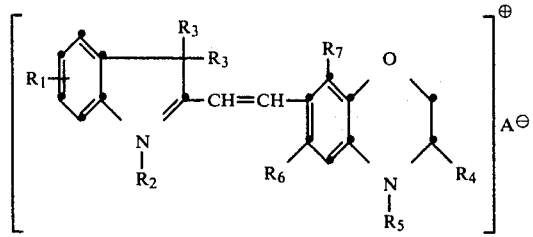

wherein $R_1$ is hydrogen, $NO_2$, halogen, $C_1$-$C_4$-alkyl, halo-$C_1$-$C_4$-alkyl, $C_1$-$C_4$-alkoxy-$C_1$-$C_4$-alkyl or $C_1$-$C_4$-alkoxy, $R_2$ is $C_1$-$C_4$-alkyl, or $C_1$-$C_4$-alkyl substituted by halogen, cyano, carbamoyl, hydroxyl, phenyl or $C_1$-$C_4$-alkoxy, $R_3$ independently of one another are each $C_1$-$C_4$-alkyl, $R_4$ is hydrogen $C_1$-$C_4$-alkyl, cyano-$C_1$-$C_4$-alkyl, aryl, halo-aryl, cyano-aryl, $C_1$-$C_4$-alkylaryl, or $C_1$-$C_4$-alkoxyaryl, $R_5$ is $C_3$-$C_4$-alkenyl, $C_1$-$C_4$-alkyl, or $C_1$-$C_4$-alkyl substituted by phenyl, acetoxy, cyano, halogen, hydroxy, or $C_1$-$C_4$-alkoxy, $R_6$ and $R_7$ independently of one another are each hydrogen, $C_1$-$C_4$-alkyl, $C_1$-$C_4$-alkoxy or halogen, and A is an anion, which process comprises condensing a 2-methyleneindoline of the formula

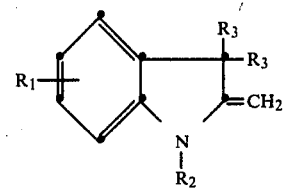

with a benzomorpholine-7-aldehyde of the formula

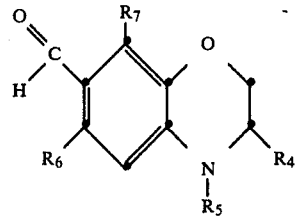

in the presence of an acid, HA.